United States Patent

Ryczek

[15] 3,638,812
[45] Feb. 1, 1972

[54] TILTING GRAIN AUGER
[72] Inventor: William G. Ryczek, Kansas City, Mo.
[73] Assignee: Allis-Chalmers Manufacturing Company, Milwaukee, Wis.
[22] Filed: Apr. 7, 1970
[21] Appl. No.: 26,221

[52] U.S. Cl..........................214/83.26, 198/114, 198/64, 214/83.32, 285/184
[51] Int. Cl..........................................B60p 1/42
[58] Field of Search..............214/83.32, 83.26, 520, 521, 214/522; 285/181, 184; 198/64, 113, 114, 88

[56] References Cited

UNITED STATES PATENTS

| | | | |
|---|---|---|---|
| 3,521,768 | 7/1970 | Rohwedder | 214/83.32 X |
| 3,100,052 | 8/1963 | Brembeck | 214/17 D |
| 2,886,262 | 5/1959 | Fletcher | 285/184 X |
| 2,296,007 | 9/1942 | Weisenberger | 214/83.32 |
| 2,479,580 | 8/1949 | Marco | 285/181 X |

*Primary Examiner*—Albert J. Makay
*Attorney*—Kenneth C. McKivett, Arthur L. Nelson and Robert B. Benson

[57] ABSTRACT

This disclosure relates to a power-operated swingable auger conveyor which can be moved from operative discharge position to an inoperative discharge position without the operator leaving his station on the combine and without breaking the power train from grain bin to auger.

1 Claims, 8 Drawing Figures

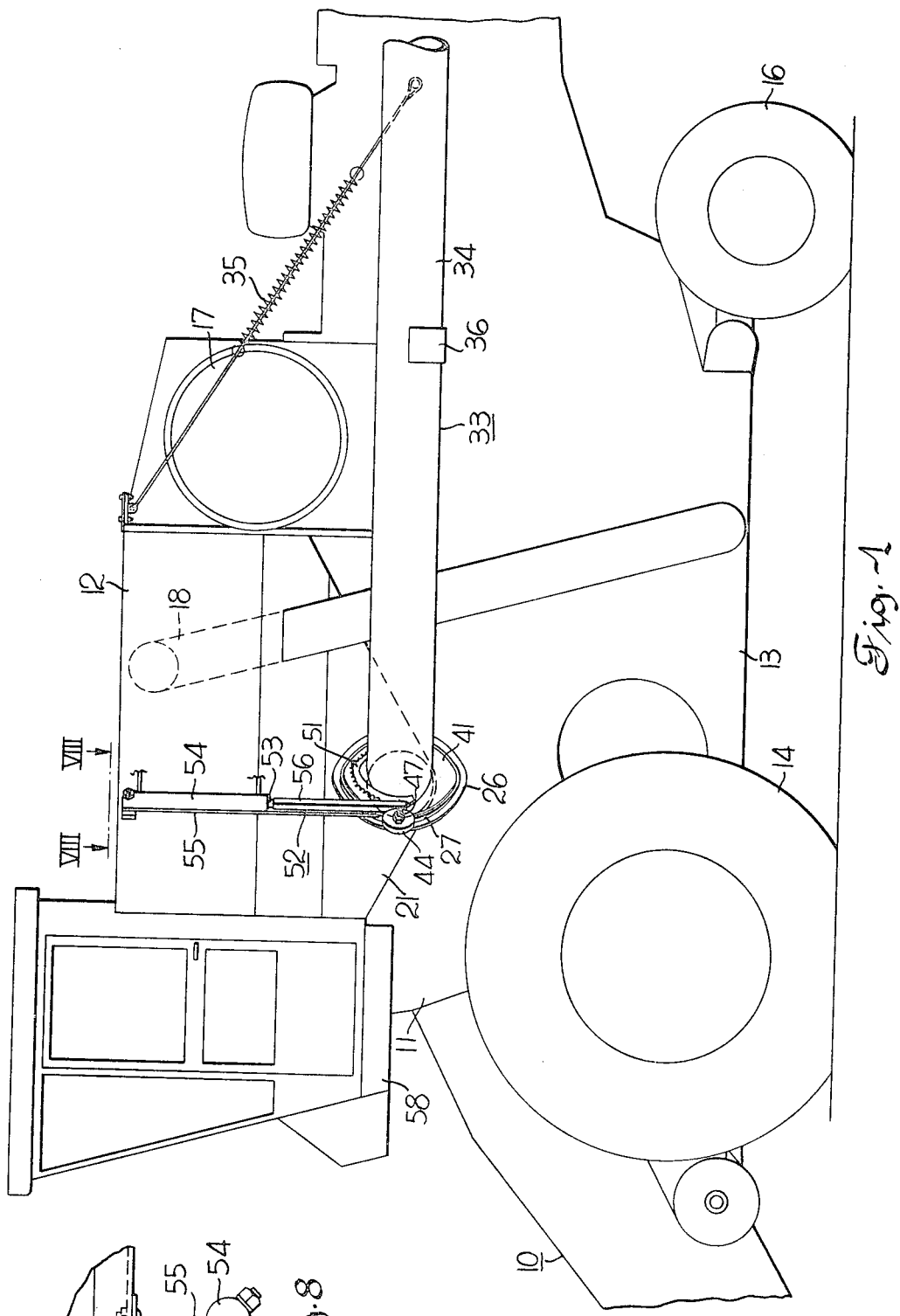

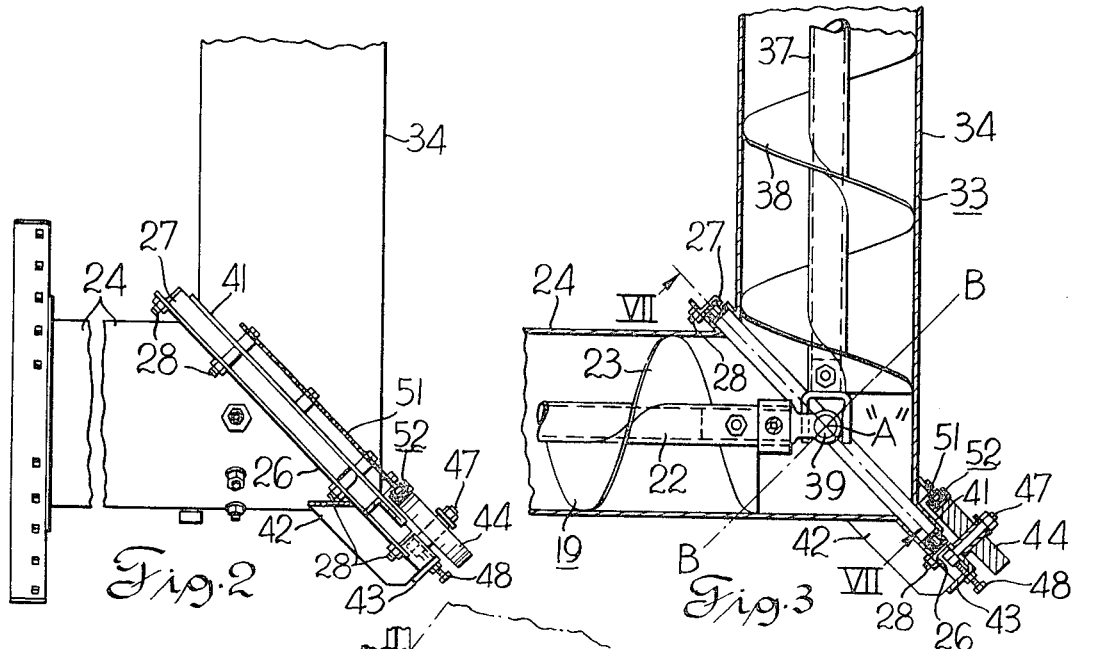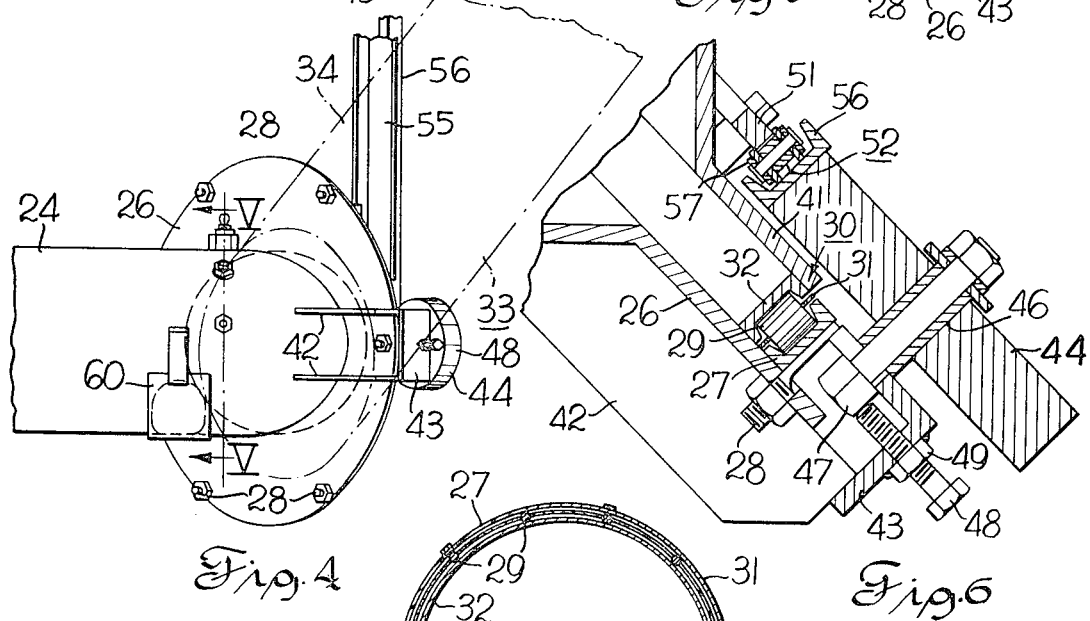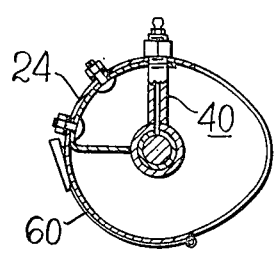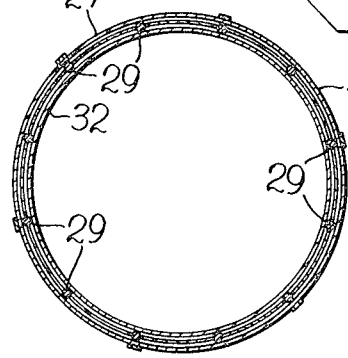

TILTING GRAIN AUGER

This invention generally relates to combined harvester threshers, and it is concerned more particularly with the provision of an improved auger-type conveying system for unloading threshed material from a storage bin which is mounted on and forms part of the machine.

Combines, particularly those of the self-propelled type are large machines both as to width and height, and these machines are ordinarily provided with a large bin into which threshed grain is delivered. When the bin is full, a wagon or truck is drawn alongside the combine and grain is discharged from the bin via a conveyor, normally of the closed auger type. After such discharge, operation of the combine may be continued until the bin is again full enough to require unloading. In the case of the typical combine, the auger unloading conveyor extends transversely upwardly at one side of the combine to an extent sufficient to provide for adequate side clearance between the combine and the truck and for adequate top clearance between the truck and the auger conveyor. This transverse overhang of the unloading conveyor materially increases the overall width of the combine. In many combines heretofore known, transport of the combine along narrow roads and through narrow gates or through areas of low clearance could only be effected by completely removing the unloading conveyor. In other combines provision was made for folding of the conveyor to a position in which it would lie alongside of the grain bin. In many constructions of the latter type, the provision for folding of the unloading conveyor is of such complicated nature and of such expense as to make it more practical to remove the conveyor than to be able to fold it.

Generally, it is an object of this invention to provide an improved harvester thresher wherein an auger-type unloading conveyor system is so arranged as to avoid the hereinbefore-outlined difficulties in a practical and entirely satisfactory manner.

More specifically, it is an object of the invention to provide an improved mounting for an auger-type conveyor on a combine which mounting permits ready selective adjustment of the conveyor either to an unloading position, or to a position for going through narrow gates, or to a position for traveling on highways or moving through other areas of limited clearance both as to width and height.

It is a further object of this invention to provide an improved conveyor mounting of the hereinabove-outlined character which is so constructed that an operator may readily adjust the conveyor to either a transport or unloading position without having to manually lift the conveyor.

A further object of this invention is to provide an improved harvester thresher of the hereinbefore-outlined character incorporating a power-adjustable mounted auger and tube assembly which need not be removed from the machine during transport, and wherein the auger can be rapidly power shifted to unloading position.

A further object of this invention is to provide a power-adjustable mounted auger wherein the powerline connection between auger and machine is not broken when the auger is shifted from loading to transport position.

A further object of this invention is to provide easily manufactured and relatively inexpensive parts adapted for use in moving an auger-type conveyor extension to a desirable and convenient position for storage and/or transport position.

The foregoing and other important objects and desirable features inherent in and encompassed by the invention will become apparent from the following detailed description and accompanying sheets of drawings, in which:

FIG. 1 is a side elevation of a combine embodying the invention showing an unloading auger conveyor in storage or transport position extending generally parallel to and within the profile of the combine;

FIG. 2 is an enlarged plan view of a portion of the auger conveyor shown in FIG. 1;

FIG. 3 is a section view of the auger conveyor shown in FIG. 2;

FIG. 4 is a front view of auger conveyor with the auger conveyor extension shown in discharge position in broken lines;

FIG. 5 is a view taken on line V—V of FIG. 4;

FIG. 6 is an enlarged portion of FIG. 3;

FIG. 7 is a view taken on line VII—VII of FIG. 3; and

FIG. 8 is a view taken on line VIII—VIII of FIG. 1.

Referring to FIG. 1 it is seen that a self-propelled harvester is provided including a cutting and conveying mechanism 10, a threshing and separating mechanism 11, and a grain or storage bin 12; all of these mechanisms being positioned on a frame structure chassis 13 including front traction wheels 14 and dirigible rear wheels 16. Also mounted on chassis 13 is an engine 17 operatively connected to the mentioned mechanisms by means (not shown). A grain elevator 18 is mounted adjacent the discharging portion of separating mechanism 11 in grain-receiving relation thereto. Grain is moved by elevator 18 and discharged into grain bin 12. A transversely horizontally extending unloading auger-type conveyor 19 (see FIGS. 2 and 3) is journaled at one end in a sidewall of grain bin 12 (by means not shown). Conveyor 19 extends horizontally just above the floor of bin 12 through wall 21 of bin 12. The aforesaid journaled end of conveyor 19 is operatively connected to engine 17 for being driven by same (by means not shown). Conveyor 19 includes a central shaft 22 upon which auger flighting 23 is mounted. The portion of conveyor 19 which extends outwardly from grain bin wall 21 is enclosed in a tube 24 carried by wall 21. The outer end of tube 24 terminates at approximately a 45° angle facing rearwardly and this outer end of tube 24 is turned over to provide a fastening flange portion 26. A channel 27 (see FIG. 6) formed into a circular configuration is attached to portion 26 by means of bolts 28. A series of rollers 29 are received in spaced-apart openings in a strap 31 and rollers 29 are received in circular channel 27. Another channel member 32 is formed into a circular configuration to provide an inner seat for rollers 29 complementary to channel 27 with strap 31 positioned between channels 27 and 32.

These rollers 29, channels 27 and 32 and strap 31 are formed in a forming machine to provide an assembled swivel unit 30 which will permit rotation of channel 32 relative to channel 27 with rollers 29 providing reasonably friction-free movement between channels. After this unit has been formed the adjacent ends of channel 27 are welded together as are the ends of channel 32. This welding retains the unit together.

An unloading auger conveyor 33 (FIG. 1) includes a tube 34 which has a counterbalancing spring mechanism 35 connected between tube 34 and bin 12. A strap 36 carried by chassis 13 assists in supporting conveyor 33 when the conveyor is being carried in transport position as shown.

Inside tube 34 (see FIG. 3) a shaft 37 is mounted. The outboard end of shaft 37 is journaled in a bearing (not shown) carried by tube 34. Auger flighting 38 is attached to shaft 37 as by welding. The inboard end of shaft 37 is attached to one end of a universal joint 39 which is also attached to one end of shaft 22. Universal joint 39 is supported by hanger 40 from tube 24 (see FIG. 5). The center "A" of universal joint 39 (see FIG. 3) is located at the center of relative rotation of channels 27 and 32.

The inboard end of tube 34 is flanged to provide fastening portions 41 for attaching channel 32 thereto as by welding. A pair of reinforcing members 42 (FIGS. 4 and 6) is attached to tube 24 and flange 26. An angle iron 43 is attached to members 42 (see FIG. 6). A press wheel 44 is rotatably supported on bushing 46 which is positioned on angle iron 43 by bolt 47. A bolt 48 is received in a nut 49 welded to angle iron 43 and a desired positioning of press wheel 44 can be obtained by adjusting bolt 48 in nut 49.

A gear segment 51 is attached to tube 34 and flange 41 and gear segment 51 is meshed with a vertically extending rack 52 which is attached at its upper end to the outboard end of piston 53 (see FIG. 1) of double-acting hydraulic ram 54 which is vertically attached to angle iron 55 which in turn is attached at its upper end to tank 12 and at its lower end to channel 27. It is to be noted that rack 52 is made up of a channel member 56 to which is attached as by welding a length of chain 57 which form the rack 52 to which gear segment 51 is meshed for operation thereby. Hydraulic ram 54 is operatively connected to the hydraulic system (not shown) of the combine and conventional controls are provided for operating ram 54 from operator's platform 58 to move rack upwardly or downwardly.

Assume that discharge auger conveyor 33 is transport position as shown in FIG. 1 and it is desired to discharge the grain accumulated in grain tank 12. The operator of the combine from his station on platform 58 would actuate a conventional valve to provide hydraulic cylinder 54 with fluid under pressure. This fluid would move piston 53 downwardly and also rack 52 which is directly connected to piston 53. Chain 57 which is a part of rack 52 would move downwardly causing flange 41 and its connected parts to rotate counterclockwise about axis B—B which passes through center "A" and such axis positioned at right angles to section line VII—VII in FIG. 3.

At first such rotation would cause the outboard end of conveyor 33 to lift up out of strap 36. Continued movement downwardly of rack 52 would cause the outboard end of conveyor 33 to move upwardly and outwardly to the dashed line position shown in FIG. 4 wherein discharge end of conveyor 33 would be extending well out from the side profile of the combine and at a height so that a truck could drive alongside the combine and its load-carrying box would be underneath the discharge end of the conveyor. The operator would then actuate the power means for driving shaft 22 and the mechanisms connected thereto. Grain in tank 12 would be moved by auger flighting 23 through conveyor 19 and by flighting 38 through tube 34 until the grain tank 12 was emptied. Thereupon the operator would reverse the process. He would discontinue the drive shaft 22, he would then actuate the hydraulic control valves to move piston 53 upwardly moving rack 52 upwardly therewith. Such movement of rack 52 would turn gear segment in a clockwise direction (viewed in FIG. 1) lowering and moving conveyor 33 into position alongside the combine and into position with strap 36 within the profile of the combine. While the drawings do not show it, when conveyor 33 is positioned as shown in FIG. 1 conveyor 33 is inside the tread line of tires 14 so that conveyor 33 would not interfere with the combine going through a narrow gate or into a barn with limited overhead.

It is to be noted that wheel 44 exerts pressure against channel 56 which in turn keeps chain 57 in mesh with gear segment 51. This pressure can be adjusted by turning bolt 48.

It is to be further noted that no helping hand is required to move conveyor 33 to unloading position or back to transport position. By this is meant the operation is entirely controlled by the operator of the combine without getting off of his operating platform 58.

An access door 60 (see FIG. 4) is provided so that universal joint 39 is accessible and such door can also be used as a cleanout door for removing material when the machine is to be stored.

The embodiments of the invention in which an exclusive property or privilege is claimed are defined as follows:

1. In a combine harvester having an operator's platform, a grain bin and a horizontally extending auger-type unloading conveyor positioned within the bottom portion of said bin, the improvement comprising an auger and tube assembly adapted to form an operative extension of said unloading conveyor and positionable in an unloading position and a transport position, said unloading conveyor and said assembly each including central drive shafts connected by a universal joint, said unloading conveyor including a tube extending horizontally from said grain bin and presenting a generally 45° face at its outboard end, means pivotally mounting said auger and tube assembly on said 45° face so that said auger and tube assembly extends longitudinally when said auger and tube assembly are in transport position and said auger and tube assembly extends upwardly and transversely outwardly when pivoted to discharge position, hydraulic means operative from said operator's platform for moving said auger and tube assembly from transport to operative position and from operative to transport position, said means for pivotally mounting said auger and tube assembly on said 45° face comprises a swivel unit made up of complementary circular channel members attached to said conveyor and to said assembly, respectively, antifriction means separating said channel members, said auger and tube assembly extending from said swivel unit at approximately 45°, said hydraulic means comprising a double-acting cylinder, a rack carried by the piston of said cylinder, a gear segment attached to said auger and tube assembly and coacting with said rack for pivoting said auger and tube assembly responsive to movement of said piston, and a wheel mounted on said conveyor for biasing said rack into driving engagement with gear segment.

* * * * *